Figure 1:
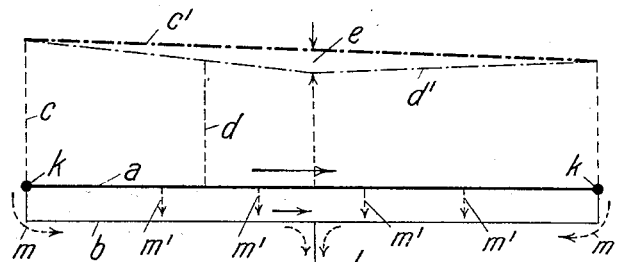

M. HÖCHSTÄDTER.
SYSTEM FOR PROTECTING ELECTRIC CURRENT DISTRIBUTING NETS AGAINST TEMPORARY INTERRUPTIONS.
APPLICATION FILED OCT. 20, 1914.

1,396,112.  Patented Nov. 8, 1921.

Inventor:
Martin Höchstädter

UNITED STATES PATENT OFFICE.

MARTIN HOCHSTADTER, OF BERLIN, GERMANY, ASSIGNOR TO N. V. LYN-PROCTECTIE MAATSCHAPPIJ TOT EXPLOITATIE VAN ELECTRO-TECHNISCHE EN ANDERE OCT-VOOIEN, OF THE HAGUE, NETHERLANDS, A DUTCH CORPORATION.

SYSTEM FOR PROTECTING ELECTRIC-CURRENT-DISTRIBUTING NETS AGAINST TEMPORARY INTERRUPTIONS.

1,396,112.     Specification of Letters Patent.     Patented Nov. 8, 1921.

Application filed October 20, 1914. Serial No. 867,683.

*To all whom it may concern:*

Be it known that I, MARTIN HOCHSTADTER, a subject of the German Emperor, residing at 186 Kurfürstendamm, Berlin, Germany, have invented certain new and useful Systems for Protecting Electric-Current-Distributing Nets Against Temporary Interruptions, of which the following is a specification.

This invention relates to a novel system for protecting electric current distributing nets against temporary interruptions of current supply in case the insulation of part of such net has become defective. For this purpose the faulty branch is immediately and automatically severed at both of its terminals from the remainder of the net so that the defect is localized and the defective net portion may be readily ascertained without an interruption of the current supply and without requiring tedious investigations. In this way, the faulty branch only is disconnected, the operation being such that this disconnection takes place while the defect is starting, *i. e.*, prior to a complete destruction of the insulation and prior to the formation of a short circuit.

With the systems heretofore generally known, the disconnection of the defective branch is obtained only after the completion of a heavy short circuit, while smaller but gradually growing defects of the insulation which may not terminate in a short circuit remain frequently unnoticed for a considerable length of time, which smaller defects are nevertheless extremely dangerous for the entire net and the apparatus connected therewith owing to the formation of sparks, traveling waves of high tension and high frequency. These prior systems have furthermore the disadvantage that they require additional conductors and apparatus for disconnecting purposes which considerably weaken the entire net and may be the cause of otherwise unnecessary disconnections in case of defects of such conductors and apparatus, the latter remarks referring more particularly to the large number of current and voltage transformers and choking devices which are interpolated with these systems between the high tension conductors and the ground.

As furthermore these known control devices remain frequently inoperative for months or even years and as their readiness for operation cannot readily be ascertained it is obvious that they may utterly fail at the moment when their operativeness is most required.

With the present invention, all of the above enumerated disadvantages are effectively overcome. My invention belongs to that class of protective systems for electric networks of mains in which there is provided for each main conductor of a branch, an equipotential control conductor, it being immaterial whether or not and to what degree both of said conductors participate in the current distribution. It is preferred, however, that one of the coördinate conductors have a greater resistance than the other. In the following description, one of the conductors will be termed main conductor while the other, usually weaker, conductor will be called control conductor. It is however, obvious that the control conductor may have dimensions and electrical properties, equal to those of the main conductor. Generally the equipotentiality between main conductor and control conductor is warranted by metallic connections at the ends of the several branches, but the same may be obtained electrostatically sufficient, in case the control conductor is located in closest proximity to the main conductor.

Between the main conductor and its equipotential control conductor, a potential or voltage displacement is effected that is confined substantially between the limits of the normal voltage drop caused by the current load. This potential displacement is generally brought into a certain dependence upon the current load of the branch. The control conductor or both the main and control conductors are provided with disconnecting mechanisms which are maintained in equilibrium by the potential displacement between the main conductor and control conductor during normal operation. If however, the electrical status of the main conductor of a branch, becomes defective, owing to a fault in the insulation or operation, the potential displacement between the main conductor and control conductor of said branch is altered so as to actuate the disconnecting mechanisms located at both ends of the branch.

The potential displacement in the control conductor relatively to the main conductor may be produced in various ways, some of which are shown in the accompanying drawing in which—

Figure 2:
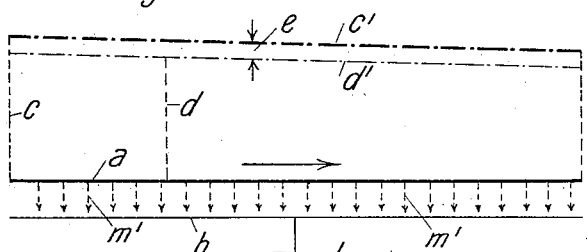
Figure 3:
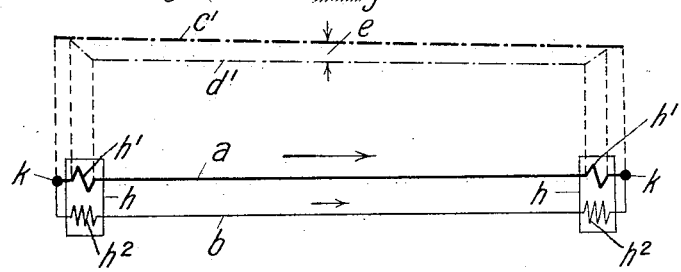
Figure 4:
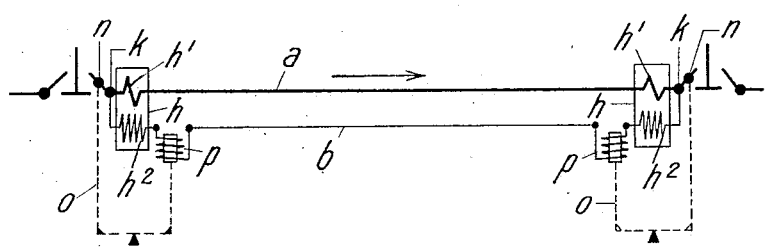

Figure 1 is a diagram showing the potential displacement caused by capacity phenomena, in case the control conductor is connected at its ends to the main conductor;

Fig. 2 a similar diagram, with the control conductor disconnected from the main conductor;

Fig. 3 a diagram in which the potential displacement is caused by transformative influences, and Fig. 4 a complete wiring diagram of a branch according to Fig. 3.

In the above diagram, the full lines designate the actual conductors, the heavy and light lines representing respectively the main and control conductors. The heavy dot and dash lines indicate the potential of the main conductors while the light dot and dash lines indicate that of the control conductors. The full line arrows indicate the direction of the useful currents, and the dotted arrows indicate the direction of the charging currents.

In Fig. 1 a main conductor and a control conductor are illustrated which are conductively connected at the ends of the branch. The control conductor should have the smallest possible cross section and the greatest possible capacity, marked $l$, against its surrounding, such as the ground $f$. In this case, the useful current flowing through the control conduit is insignificant relatively to the capacity current taken up thereby at a high working voltage, and it may readily be demonstrated that capacity currents flow from the ends $k$ of the main conductor to the control conductor, as indicated by the dotted arrows $m$ (Fig. 1). These capacity or charging currents maintain during normal operation, a fixed mutual proportionality, while but comparatively weak charging currents pass from the main conductor through the dielectric toward the control conductor. If the main conductor and the control conductor were not connected at the points $k$, the control conductor would be evenly charged throughout its length through the dielectric, as illustrated in Fig. 2.

In Fig. 1, the letter $a$ indicates the main conductor and $b$ indicates the control conductor which being as thin as possible while possessing a great surface area should be arranged in close proximity to the main conductor. Both of these conductors are connected at $k$. The ordinate $c$ indicates the maximum potential obtaining in the main conductor, at one of the connection points $k$, and $c^1$ is a line drawn to illustrate the potential along the main conductor, a normal voltage drop being shown in the direction of the flow of the main current as indicated by the corresponding arrow. The potential of the control conductor $b$ at the connecting points $k$ is equal to that of the main conductor. Toward the middle of the branch however, the potential difference between the main conductor and the control conductor gradually increases. At $d$, I have shown an ordinate representing the potential of the control conductor at an arbitrarily selected point between its ends, and it will be noticed that this ordinate indicates a smaller potential than that prevailing at the corresponding point of the main conductor. This potential difference is caused by the fact that the major part of the charging current passes in substantially even portions from the main conductor $a$ over the points $k$ to the control conductor $b$ while but a comparatively small portion, indicated in Fig. 1 by the arrows $m^1$, flows from the main conductor through the dielectric to the control conductor. Owing to this peculiar disposition of the charging currents that flow in the direction of the dotted arrows $m$ toward the middle of the control conductor and thence over the condenser $l$ to the ground, a potential displacement will be produced in the control conductor as illustrated in Fig. 1 by the line $d^1$ whereby the point of minimum potential is not located at one end of the branch (as is the case with the line $c^1$), but at the middle thereof, $e$ being the maximal potential difference between the main and control conductors.

In Fig. 2, the potential is illustrated in case the main conductor $a$ is disconnected from the control conductor. Here the charging current cannot be transmitted from the main conductor to the control conductor over the conductively connected ends thereof, but the charging is effected by charging currents $m^1$ passing through the dielectric and uniformly distributed over the entire length of said conductors. The potential lines $c^1$ and $d^1$ will in this case uniformly fall from one end toward the other end of the branch.

In Figs. 1 and 2, it is assumed that the control conductor possesses a comparatively large capacity as is for instance the case when said conductor is located at the surface of the main conductor. If however, the control conductor is located within the interior of the main conductor, its capacity will be relatively small in which case the potential displacement must be obtained in a different manner, such for instance as illustrated in Fig. 3.

Here a transformer $h$ is provided at each end of the branch, the primary coil $h^1$ forming part of the main conductor $a$, while the secondary coil $h^2$ forms part of the control conductor $b$. The secondary coils $h^2$ are preferably so connected or wound that their voltages are directed opposite each other. In this case, a uniform potential difference $e$ exists between the main conductor and the control conductor. At the connecting lines between the transformers $h$ and the points $k$ both conductors have of course the same potential.

As above stated, it is assumed that the secondary coils $h^2$ of the transformers $h$ act against each other. It is however, also possible that the secondary tensions of the transformers act cumulatively, in which case the line $d^1$ would assume a different course relatively to line $c^1$. But in both instances, the course of the potential between the main conductor and the control conductor may be readily predetermined.

With the above diagrams as illustrated in Figs. 1 to 3 it is assumed that the potential of the main conductor is not appreciably influenced by the control conductor, i. e., that no perceivable reaction upon the main conductor takes place. This advantage is obtained in the simplest manner by using a control conductor of small cross section, such as a test conductor. In this case the instruments, such as the transformers $h$, may be extremely small and may in many instances, not exceed the size of test transformers.

It is of course possible to still further influence the resistance conditions of the control conductor relatively to the main conductor by providing resistances at the ends of the control conductor, by means of which the potential displacement between the main conductor and the control conductor may be varied.

For obtaining the above described results, a conveniently shaped control conductor may be arranged in close proximity to the main conductor, but preferably an insulated small portion of the main conductor strands may be used for this purpose.

Hereinabove it has been described in which way the course of the current and potential of a control conductor may be varied in conformity with the electric conditions of the coöperative main conductor. If suitable release apparatus or switches are interpolated in the control conductor or control conductor and main conductor, these apparatus may be so adjusted relatively to the potential displacement that equilibrium exists during normal working conditions and the switches are not actuated. Whenever this equilibrium is disturbed owing to a change of the electric conditions of the main conductor, the current and voltage conditions existing in the control conductor together with the potential displacement between both conductors are altered in such a manner that the releasing apparatus are actuated to disconnect the corresponding branch from the remainder of the net.

The selection of suitable releasing organs depends upon the potential displacement and its influence upon the current conditions of the control conductor. Generally it is of advantage to produce the potential displacement in such a manner that there exists within the control conductor and in the releasing organs, an equilibrium which is independent of the varying load of the main conductor. If for instance with the arrangement shown in Fig. 3, the main conductor $a$ becomes grounded, at any place, owing to defective insulation, the normal current flow from the left toward the right will stop and the current will pass from both ends $k$ toward the defective spot. Owing to the thus altered influence of the main conductor upon the control conductor, the course of the tension line $d^1$, i. e., the potential displacement between the main conductor and the control conductor is affected, so that the equilibrium in the control conductor and its releasing organs is suspended and the corresponding branch is cut off from the remainder of the net. A change of the tension line $d^1$ and the consequent disconnection of the branch will also take place, in case a puncture occurs between the main conductor and control conductor.

Fig. 4 illustrates the way in which the artificially produced potential displacement between the main and control conductors, depending upon the normal working conditions of the main conductor, may practically be utilized for disconnecting defective branches. $a$ and $b$ indicate the main conductor and control conductor respectively which are connected at their ends as at $k$. $h^1$ and $h^2$ are the primary coils and secondary coils respectively of the transformers $h$ which transmit the influence of the main conductor upon the control conductor and produce the necessary potential displacement between both conductors. $n$ indicates the switch which is actuated from a relay $p$ through suitable connecting means $o$. This relay may be inserted into the circuit in various ways according to the selection of the potential displacement between the main and control conductors, it being shown as simple relay interpolated in the control conductor, although a differential relay may be used, one coil of which is connected to the main conductor, while its other coil is connected to the control conductor. The relay $p$ is so adjusted that during normal operation, i. e., as long as the artificially produced equilibrium between the main and control conductors prevails, the switch $n$ will not be actuated. As soon as a substantial change of the current conditions occurs in a branch owing to defective insulation, etc., the relay $p$ is moved out of its neutral position to actuate the switch $n$. The more sensitive the adjustment of the relay may be, the sooner the defective branch will be severed from the net before the insulation is completely punctured. This arrangement requires however, that provisions be made for preventing normal changes of the current conditions of a branch from influencing the releasing organs or switches. By a suitable construction of the transformers $h$ and a sufficiently high potential displacement caused by said transformers, a considerable sensitiveness may be obtained which is to a high degree, independent of the kind and place of the defect in the branch.

With various switching members which may be used in conjunction with the diagram illustrated in Fig. 1, (the same as the wiring diagram shown in Fig. 4 depends upon the diagram shown in Fig. 3) the charging currents continuously flowing through the control conductors are advantageously so sent through the relays located at the junction points of the net, that the charging currents of all branches terminating at said points cause the relays to assume their equilibrium position as long as the working conditions are normal. In this way the control current flowing through each branch is utilized as a gage for the electrical condition thereof. With the occurrence of defects, such as spark discharges, the strength and phase of the charging current will be altered and the relays limiting the defective branch will leave their neutral position to actuate the switches even before the insulation is completely destroyed. In order to render the arrangement sensitive, the control conductor and the control current flowing therethrough may be made still more independent of the varying load of the main conductor, for instance by providing special transformers which induce, during normal operation from the main conductor in the control branch, a current that is about proportional to the main current, said induced current being equal and opposite to the current flowing through the control conductor owing to the difference in voltage between the ends of said conductor (line $c^1$ in the above figures). Such an arrangement would be a combination of the diagrams shown in Figs. 1 and 3. In this case also, the releasing organs $p$ forming part of the control conductor, may either directly or by means of interpolated separate switching members cause the operation of the main switches $n$, the arrangement being preferably such that when disconnecting the main conductor, the control conductor is also disconnected. Whenever a puncture occurs with a wiring system based upon the diagram shown in Fig. 1, it is apparent that the control current of the corresponding branch will increase in strength at both ends thereof and will be retarded in the phase relatively to the charging current that normally leads the voltage by 90°. In this way the equilibrium of the releasing relays $p$ located at the ends of this branch with respect to the practically unchanged control currents of the adjoining branches of the same main conductor, which control currents pass also through these relays, becomes disturbed in such a manner that the relays exercise a mechanical or electrical function so as to disconnect the defective branch by means of the main switches located at the ends thereof.

I claim:

1. Method of automatically disconnecting defective branches from a network of mains, each branch comprising a main conductor and an equipotential control conductor, which consists in causing the main conductor of each branch to inductively produce during normal operation within the coöperating control conductor a potential displacement by means of which the releasing organs of said branch are maintained in equilibrium and in causing an operation of said organs upon an alteration of the normal potential displacement owing to a defect said operation effecting a disconnection of the defective branch from the net.

2. A method of automatically disconnecting defective branches from a network of mains, each branch comprising a main conductor and an equipotential control conductor, of a smaller cross section, which consists in causing the main conductor of each branch to inductively produce during normal operation within the coöperating control conductor a potential displacement by means of which the releasing organs of said branch are maintained in equilibrium, and in causing an operation of said organs upon an alteration of the normal potential displacement owing to a defect, said operation effecting a disconnection of the defective branch from the net.

3. Method of automatically disconnecting defective branches from a network of electric mains, each branch comprising a main conductor and a control conductor connected therewith electrically at the ends of the branch, which consists in inductively producing within the control conductor, by the action of the main conductor on every portion of the control conductor, a potential displacement which normally maintains in equilibrium the releasing or cut-out organs of said branch, and in causing, upon the rising of a defect and the resulting alteration of the normal potential displacement, such an operation of said organs as will effect a disconnection of the defective branch from the net.

4. Method of automatically disconnecting defective branches from a network of electric mains, each branch comprising a main conductor and a control conductor disposed lengthwise of said main conductor from one end of the branch to the other and including portions controlling the releasing or cut-out organs of said branch, which consists in inductively producing within the control conductor, by the action of the current flowing through the main conductor, a potential displacement which normally maintains the said cut-out organs in equilibrium and connecting position, and in causing, upon the arising of a defect and the resulting alteration of the normal potential displacement, such an operation of said organs as will effect a disconnection of the defective branch from the network.

In testimony whereof he has hereunto affixed his signature in presence of two witnesses.

MARTIN HOCHSTADTER.

Witnesses:
HENRY HASPER,
WOLDEMAR HAUPT.